US006753406B2

(12) United States Patent
Wulf et al.

(10) Patent No.: US 6,753,406 B2
(45) Date of Patent: Jun. 22, 2004

(54) PROCESS AND MEANS FOR REDUCING FORMALDEHYDE EMISSION DURING THE PROCESSING OF THERMOPLASTICS WITH ADMIXED POLYACETAL

(75) Inventors: Stefan Wulf, Mönchengladbach (DE); Jens Schiebisch, Freigericht (DE); Roger Knapp, Hünfelden (DE)

(73) Assignee: Ticona GmbH (DE)

( * ) Notice: Subject to any disclaimer, the term of this patent is extended or adjusted under 35 U.S.C. 154(b) by 0 days.

(21) Appl. No.: 10/314,564

(22) Filed: Dec. 9, 2002

(65) Prior Publication Data

US 2003/0125514 A1 Jul. 3, 2003

(30) Foreign Application Priority Data

Dec. 12, 2001 (DE) .......................................... 101 60 866

(51) Int. Cl.[7] .................................................. C08F 6/00
(52) U.S. Cl. ....................... 528/480; 524/424; 524/593; 525/155; 525/400
(58) Field of Search ................ 524/424, 593; 525/155, 400; 528/480

(56) References Cited

U.S. PATENT DOCUMENTS 5,218,041 A * 6/1993 Arnoldi et al. ............. 524/593
6,399,699 B1   6/2002 Tanigawa et al. .......... 524/593

FOREIGN PATENT DOCUMENTS

| DE | 197 05 559 | 8/1997 |
| EP | 0 289 142 | 11/1988 |
| EP | 0 440 441 | 8/1991 |
| EP | 0 498 620 | 8/1992 |
| EP | 0 882 763 | 12/1998 |

* cited by examiner

Primary Examiner—Terressa Boykin
(74) Attorney, Agent, or Firm—Connolly Bove Lodge & Hutz LLP

(57) ABSTRACT

The present invention relates to a process for reducing formaldehyde emission from thermoplastics mixed with polyacetal, which comprises melting the thermoplastic mixture in the presence of at least one stabilizer in a mixing assembly and subjecting it to further processing steps.

During this process, formaldehyde emission deriving from decomposition of the polyacetal is markedly reduced by adding suitable additives/stabilizers.

21 Claims, No Drawings

PROCESS AND MEANS FOR REDUCING FORMALDEHYDE EMISSION DURING THE PROCESSING OF THERMOPLASTICS WITH ADMIXED POLYACETAL

High-quality recycling of plastic components requires that the used parts or production residue collected should be as nearly as possible composed of a single type of material, i.e. not comprise foreign plastics. However, sorting and/or separation for this purpose is often difficult and a mixture is therefore often inevitable. Examples of consequences of certain proportions of foreign plastics are impairment of properties of the main plastic, or impairment of processing in the melt due to decomposition reactions.

Polyacetal is often found as contaminant in the plastics. The decomposition reactions can be controlled by matching the processing conditions, such as temperature and residence time, to the main plastic, but this procedure cannot be used for polyacetal present as contaminant. In addition, it is likely that the main plastic, which may contain acidic end groups, or comprise additives or catalyst residues, will react with the polyacetal.

It is particularly during recycling that thermoplastics may comprise undesired admixtures of polyacetal. The polyacetal contamination generally enters the plastics to be recycled when polyacetal components are not isolated, or cannot be isolated, from the actual plastic components to be recycled. Another way in which polyacetal contamination can enter other plastics is through inappropriate operation with inadequate cleaning of the apparatus after production of previous products which comprise polyacetal.

Formaldehyde can form during processing in the melt of thermoplastics which comprise small admixtures of polyacetal. The polyacetal depolymerizes or decomposes in the melt. Even small amounts, e.g. less than 0.5% by weight, of polyacetal in the main plastic can be sufficient to liberate undesirable concentrations of formaldehyde.

It is well known that polyacetals can decompose thermally during processing in the melt, thus liberating formaldehyde.

High processing temperatures above 230° C. and long residence times accelerate the degradation (Becker/Braun, Kunststoff-Handbuch, [Plastics Handbook], Volume 3/1, Polycarbonate, Polyacetal, Polyester, Cellulose ester, [Polycarbonates, polyacetals, polyesters, cellulose esters], Carl Hanser Verlag Munich, Vienna, 1992). In addition, polyacetals can react with acidic compounds, additives, catalyst residues, etc., with liberation of formaldehyde.

The Bayer A G publication ATI 0305 "Recycling und Design" [Recycling and Design] discloses that admixture of polyacetal in the recycling process should be avoided since it results in inadequate properties of the main plastic. The formation of formaldehyde from admixtures from polyacetal in other plastics is described, taking the example of polyester recycling.

Fleischer et al. in Kunststoffe 9/92, describe the product recycling and feedstock recycling of pure polyacetal.

It was therefore an object to reduce the amount of formaldehyde liberated during the processing, in the melt, of thermoplastics mixed with polyacetal.

This object is achieved by means of a process for reducing formaldehyde emission from thermoplastics mixed with polyacetal, which comprises melting the thermoplastic mixture in the presence of at least one stabilizer, i.e. a chemical compound having a stabilizing effect, in a mixing assembly and subjecting it to further processing steps.

Surprisingly, it has been found that this process can drastically reduce formaldehyde emission.

This is all the more surprising since the processing conditions selected during the processing in the melt of thermoplastics other than polyacetal, and in particular during their recycling, are markedly less favorable than those for the processing of pure polyacetal.

It is also surprising since it is known that polyacetal can decompose when even small amounts of inappropriate foreign materials are present.

The present invention therefore provides a process for reducing formaldehyde emission from thermoplastic mixtures.

The invention further provides the use of stabilizers in the process of the invention, i.e. for reducing formaldehyde emission in thermoplastic mixtures.

The process of the invention is in principle suitable for the processing of any thermoplastic mixtures which comprise at least one thermoplastic other than polyacetal but contaminated with polyacetal.

Examples of thermoplastics are described in Saechtling, Kunststoff-Taschenbuch [Plastics Handbook], Hanser Verlag, 1998, 27$^{th}$ Edition, on pp. 375-534, incorporated herein by way of reference.

For the purpose of the invention, the term thermoplastic polymers in principle includes all of the known synthetic, natural or, modified natural polymers which can be processed in the melt, with the exception of polyacetal.

Examples which may be mentioned are:

Polylactones, such as poly(pivalolactone) and poly (caprolactone);

Polyurethanes, such as the polymerization products of diisocyanates, for example naphthalene 1,5-diisocyanate, p-phenylene diisocyanate, m-phenylene diisocyanate, tolylene 2,4-diisocyanate, tolylene 2,6-diisocyanate, diphenylmethane 4,4'-diisocyanate, 3,3'-dimethylbiphenyl 4,4'-diisocyanate, diphenylisopropylidene 4,4'-diisocyanate, 3,3'-dimethyidiphenylmethane 4,4'-diisocyanate, 3,3'-dimethoxybiphenyl 4,4'-diisocyanate, dianisidine diisocyanate, toluidine diisocyanate, hexamethylene diisocyanate, 4,4'-diisocyanatodiphenylmethane, hexamethylene 1,6-diisocyanate, and dicyclohexylmethane 4,4'-diisocyanate, with polyesters derived from dicarboxylic acids and from long-chain diols, for example poly(tetramethylene adipate), poly(ethylene adipate), poly(1,4-butylene adipate), poly(ethylene succinate), and poly(2,3-butylene succinate), and/or with polyetherdiols derived from one or more diols, such as ethylene glycol or propylene glycol, or polydiols, such as diethylene glycol, triethylene glycol, and/or tetraethylene glycol;

Polycarbonates, such as poly[methanebis(4-phenyl) carbonate], poly[dimethylmetane bis(4-phenyl) carbonate], poly[diphenylmethanebis(4-phenyl) carbonate], and poly[cyclohexane-1, 1 bis(4-phenyl) carbonate];

Polysulfones, such as the reaction product of the sodium salt of 2,2-bis(4-hydroxyphenyl) propane or of 4,4'-dihydroxydiphenyl ether with 4,4'-dichlorodiphenyl sulfone;

Polyethers, polyketones, and polyether ketones, for example polymerization products of hydroquinone, of 4,4'-dihydroxybiphenyl, of 4,4'-dihydroxybenzophenone, or of 4,4'-dihydroxydiphenyl sulfone with dihalogenated, in particular difluorinated or dichlorinated, aromatic compounds typified by 4,4'-dihalodiphenylsulfone, 4,4'-dihalodibenzophenone, bis-4,4'-dihalobenzoylbenzene, and 4,4'-dihalobiphenyl;

Polyamides, such as poly(4-aminobutanoate), poly (hexamethyleneadipamide), poly(6-aminohexanoate), poly(m-xylylene adipamide), poly(p-xylylene sebacamide), poly(2,2,2-trimethylhexamethylene terephthalamide), poly(metaphenyleneisophthalamide) (NOMEX), and poly(p-phenyleneterephthalamide) (KEVLAR);

Polyesters, such as poly(ethylene acetate), poly(ethylene-1,5-naphthalate), poly(1,4-cyclohexanedimethylene terephthalate), poly(ethylene oxybenzoate) (A-TELL), poly(parahydroxybenzoate) (EKONOL), poly(1,4-cyclohexylidenedimethylene terephthalate) (KODEL), (cis) poly(1,4-cyclohexylidenedimethylene terephthalate) (Kodel), polyethylene terephthalate and polybutylene terephthalate;

Poly(arylenoxides), such as poly(2,6-dimethyl-1,4-phenylene oxide) and poly-(2,6-diphenyl-1,4-phenylene oxide);

Liquid-crystalline polymers, such as the polycondensation products from the monomers group consisting of terephthalic acid, isophthalic acid, naphthalene-1,4-dicarboxylic acid, naphthalene-2,6-dicarboxylic acid, biphenyl-4,4'-dicarboxylic acid, 4-hydroxybenzoic acid, 6-hydroxy-2-naphthylenedicarboxylic acid, hydroquinone, 4,4-dihydroxybiphenyl and, 4-aminophenol;

Poly(arylensulfides), such as poly(phenylene sulfide), poly (phenylene sulfide ketone), and Poly(phenylene sulfide sulfone);

Polyetherimides;

Vinyl polymers and their copolymers, for example polyvinyl acetate, polyvinyl chloride, polyvinyl butyral, polyvinylidene chloride, and ethylene-vinyl acetate copolymers;

Polyacrylic derivatives, such as polyacrylate and its copolymers, e.g. polyethylene acrylate, poly(n-butyl acrylate), polymethyl methacrylate, polyethyl methacrylate, poly(n-butyl methacrylate), poly(n-propyl methacrylate), polyacrylonitrile, water-insoluble ethylene acrylic acid copolymers, water-insoluble ethylene vinyl alcohol copolymers, acrylonitrile copolymers, methyl methacrylate-styrene copolymers, ethylene ethyl acrylate copolymers, and acrylic-butadiene-styrene copolymers;

Polyolefins, such as poly(ethylene), e.g. low-density poly (ethylene) (LDPE), linear low-density poly(ethylene) (LLDPE), or high-density poly(ethylene)(HDPE), poly (propylene), chlorinated poly(ethylene), e.g. chlorinated low-density poly(ethylene), poly(4-methyl-1-pentene), and poly(styrene);

Water-insoluble ionomers;

Poly(epichlorohydrin);

Furan polymers, such as poly(furan);

Cellulose esters, such as cellulose acetate, cellulose acetate butyrate, and cellulose propionate;

Silicones, such as poly(dimethylsiloxane), and poly (dimethylsiloxane-co-phenylmethylsiloxane);

Protein thermoplastics;

Thermoplastic elastomers, for example those derived from one or more from the following polymers;

Polyurethane elastomers, fluoroelastomers, polyester elastomers, polyvinyl chloride, thermoplastic butadiene-acrylonitrile elastomers, thermoplastic poly(butadiene), thermoplastic poly(isobutylene), ethylene-propylene copolymers, thermoplastic ethylene-propylene-diene terpolymers, thermoplastic sulfonated ethylene-propylene-diene terpolymers, poly(chloroprene), thermoplastic poly(2,3-dimethylbutadiene), thermoplastic poly (butadiene-pentadiene), chlorosulfonated poly(ethylene), block copolymers composed of segments of amorphous or (semi)crystalline blocks, for example poly(styrene), poly (vinyltoluene), poly(t-butylstyrene), and polyesters, and elastomeric blocks, such as poly(butadiene), poly (isoprene), ethylene-propylene copolymers, ethylene-butylene copolymers, ethylene-isoprene copolymers, and hydrogenated derivatives of these, such as SEBS, SEPS, SEEPS, und also hydrogenated ethylene-isoprene copolymers with increased content of 1,2-linked isoprene, polyethers, styrene polymers, such as ASA (acrylonitrile-styrene-acrylate), ABS (acrylonitrile-butadiene-styrene), or PC/ABS (polycarbonate/ABS), and the like, for example the products marked by Kraton Polymers under the tradename KRATON, and also all of the mixtures and alloys (miscible and immiscible blends) of two or more of the polymers mentioned.

The process of the invention is advantageously used with polycarbonate (PC), with polyesters, such as polybutylene terephthalate or polyethylene terephthalate, with acrylonitrile-styrene-acrylate copolymers (ASA), with polypropylene and compounded polypropylene materials, or else with polyamides or with mixtures of two or more of these polymers.

The polyacetal present as contamination or as admixture may be a polyacetal homo- or copolymer or a mixture of these. Polyacetals are also termed polyoxymethylenes.

These materials are described in Saechtling, Kunststoff-Taschenbuch [Plastics Handbook], Hanser Verlag, 1998, $27^{th}$ Edition, on pp. 462-464, incorporated herein by way of reference.

These polymers are known to the skilled worker and are described in the literature. The homopolymers are generally obtained by polymerizing formaldehyde or trioxane, and the polymerization here may be initiated cationically or anionically. Polyoxymethylene copolymers also contain oxyalkylene units alongside oxymethylene units, and the alkylene groups here may contain from 2 to 8 carbon units, linear or branched.

The polyoxymethylenes (POMs), for example as described in Example DE-A-2,947,490, are generally unbranched linear polymers which generally contain at least 80%, preferably at least 90%, of oxymethylene units (($-CH_2O-$).

The term polyoxymethylenes here encompasses homopolymers of formaldehyde and also those of its cyclic oligomers, such as trioxane or tetroxane, and also corresponding copolymers.

Homopolymers of formaldehyde or of trioxane are polymers of this type whose hydroxy end groups have been chemically stabilized in a known manner to resist degradation, e.g. by esterification or etherification. Copolymers are polymers made from formaldehyde or from its cyclic oligomers, in particular trioxane, and from cyclic ethers, cyclic acetals, and/or linear polyacetals. These polyoxymethylene homo- or copolymers are known per se to the skilled worker and are described in the literature. These polymers very generally have at least 50 mol % of $-CH_2O-$ repeat units in the main polymer chain.

The homopolymers are generally prepared by polymerizing formaldehyde or trioxane, preferably in the presence of suitable catalysts. Examples of particularly suitable catalysts are boron trifluoride and trifluoromethanesulfonic acid.

For the purposes of the invention, preference is given to polyoxymethylene copolymers, in particular those which also contain, alongside the $-CH_2O-$ repeat units, up to 50 mol %, preferably from 0.1 to 20 mol %, and in particular from 0.5 to 10 mol %, of repeat units of the following formula

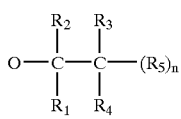

where $R^1$ to $R^4$, independently of one another, are a hydrogen atom, a $C_1$–$C_4$-alkyl group, or a halo-substituted alkyl group having from 1 to 4 carbon atoms, and $R^5$ is —$CH_2$—, —O—$CH_2$—, or a $C_1$–$C_4$-alkyl- or $C_1$–$C_4$-haloalkyl-substituted methylene group, or a corresponding oxymethylene group, and n is from 0 to 3.

These groups may advantageously be introduced into the copolymers by the ring-opening of cyclic ethers. Preferred cyclic ethers are those of the formula

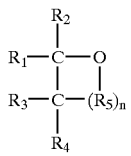

where $R^1$ to $R^5$ and n are as defined above.

Cyclic ethers which may be mentioned as examples are ethylene oxide, propylene 1,2-oxide, butylene 1,2-oxide, butylene 1,3-oxide, 1,3-dioxane, 1,3-dioxolane, and 1,3-dioxepan, and comonomers which may be mentioned as examples are linear oligo- or polyformals, such as polydioxolane or polydioxepan.

Use is also made of oxymethyleneterpolymers, for example those prepared by reacting trioxane with one of the abovementioned cyclic ethers and with a third monomer, preferably a bifunctional compound of the formula

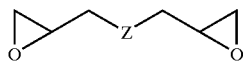

where Z is a chemical bond, —O— or —ORO— (R=$C_1$–$C_8$-alkylene or $C_2$–$C_8$-cycloalkylene).

Preferred monomers of this type are ethylene diglycide, diglycidyl ether, and diethers composed of glycidyl units and formaldehyde, dioxane, or trioxane in a molar ratio of 2:1, and also diethers composed of 2 mol of glycidyl compound and 1 mol of an aliphatic diol having from 2 to 8 carbon atoms, for example the diglycidyl ethers of ethylene glycol, 1,4-butanediol, 1,3-butanediol, 1,3-cyclobutanediol, 1,2-propanediol, or 1,4-cyclohexene diol, to mention just a few examples.

Processes for preparing the polyoxymethylene homo- and copolymers described above are known to the skilled worker and are described in the literature.

The compositions of the invention usually have only small amounts of polyacetals, for example from 0.1 to 5.0% by weight, preferably from 0.2 to 1.0% by weight, based on the composition.

The present invention is characterized by the presence of at least one stabilizer. The presence of the stabilizer reduces formaldehyde emission.

For the purposes of this description, a stabilizer is any compound whose effect is that less formaldehyde escapes from the molten thermoplastic than in its absence.

Particularly suitable stabilizers are nitrogen-containing stabilizers, and also carboxylic salts.

Carboxylic salts, preferably carboxylic salts of divalent metal ions, are suitable for use as stabilizer, particular preference being given to carboxylic salts of alkaline earth metals.

The metal carboxylic salt may be a carboxylic salt having one or more carboxylic functions, and may contain one or more metal ions. It is therefore also possible to use mixed salts, i.e. salts having more than one metal ion. It is likewise possible to use mixed salts which derive from two or more different carboxylic acids.

Examples of suitable carboxylic acids are succinic acid, citric acid, acetic acid, formic acid, propionic acid, butyric acid, valeric acid, adipic acid, tartaric acid, stearic acid, palmitic acid, and montanic acids.

Preferred metal ions are alkaline earth metal ions.

Examples of suitable metal ions are magnesium, calcium, strontium, barium, zinc, and aluminum.

Examples of salts which may be used advantageously are calcium citrate and tricalcium citrate.

Other advantageous salts are those of fatty acids, in particular salts of higher fatty acids having from 10 to 32 carbon atoms, preferably from 14 to 32 carbon atoms.

Particular preference is given to salts of the montanic acids and stearic acid.

Preferred metals are those which occur as mono- or divalent ions, e.g. alkali metals and alkaline earth metals, in particular alkaline earth metals.

Particular preference is given to magnesium and calcium.

A preferred stabilizer is calcium stearate, and very particular preference is given to magnesium stearate.

According to the invention, the amount usually used as the carboxylic salt is from 0.0001 to 5% by weight, preferably from 0.001 to 1% by weight.

Nitrogen-containing stabilizers may also be used as stabilizer. The amounts usually used of these are from 0.001 to 5% by weight, preferably from 0.01 to 1.0% by weight, particularly preferably from 0.03 to 0.5% by weight.

These are preferably heterocyclic compounds which contain at least one nitrogen atom in the ring.

Examples are pyrrolidine, piperidine, pyrrol, pyridine, purine, indol, carbazol, tryptophan, oxazole, imidazole, thiazol, picoline, lutidine, collidine, quinoline, pyridazine, pyrimidine, pyrazine, and derivatives of these.

Advantageous compounds are heterocyclic compounds having at least one nitrogen atom as heteroatom adjacent to an amino-substituted carbon atom, e.g. aminopyridine and compounds derived therefrom, or melamine. Advantageous compounds of this general type are aminopyridine and compounds derived therefrom. In principle, all of the aminopyridines are suitable, e.g. melamine, 2,6-diaminopyridine, substituted and dimeric aminopyridines, as are pyrrolidone and compounds derived therefrom, and mixtures prepared from these compounds.

Examples of suitable pyrrolidones are imidazolidinone and compounds derived therefrom, e.g. hydantoin, the derivatives of which are particularly advantageous, and especially advantageous compounds among these are allantoin and its derivatives.

Other particularly advantageous compounds are triamino-1,3,5-triazine (melamine) and its derivatives, e.g. melamine-formaldehyde condensates and methylolmelamine.

Very particular preference is given to melamine, methylolmelamine, melamine-formaldehyde condensates, and allantoin.

Other nitrogen-containing stabilizers which may be used are polyamides, in particular oligomeric polyamides.

Particularly suitable polyamides are those which contain adipic acid residues or isophoronediamine residues as monomer units, in particular polyamides composed of both of the abovementioned monomer units.

These products have particularly preferably been provided with stearic acid end groups.

The nitrogen-containing stabilizers may be used individually or in combination.

It is also possible to use mixtures of various stabilizers, for example mixtures of nitrogen-containing stabilizers with metal carboxylic salts.

In principle, any heatable mixing assembly may be used as mixing assembly in the process of the invention. Examples of suitable mixing assemblies and mixing processes are described in: Saechtling, Kunststoff-Taschenbuch [Plastics Handbook], Hanser Verlag, 1998, 27$^{th}$ Edition on pp. 202 to 217, incorporated herein by way of reference.

One way of mixing the thermoplastic mixed with polyacetal is to use kneaders, and mention may be made at this point of the Brabender kneader, merely as an example.

In one preferred embodiment of the process of the invention, the mixing assembly is composed of at least one screw-based machine.

In one particularly preferred embodiment, extruders, in particular twin-screw extruders, are used as screw-based machines.

The melt temperatures are in the ranges for the respective thermoplastics used, mostly from 100 to 500° C., advantageously from 150 to 350° C.

Advantageous processing temperatures are substantially dependent on the thermoplastic used.

Mention may be made at this point, merely by way of example, of advantageous temperatures of from 160 to 260° C. for LDPE, from 260 to 300° C. for HDPE, and from 220 to 270° C. for polypropylene.

In principle, any of the processes for processing thermoplastics are suitable further processing steps. Suitable processes are described in Saechtling, Kunststoff-Taschenbuch [Plastics Handbook], Hanser Verlag, 1998, 27$^{th}$ Edition on pp. 201–369, incorporated herein by way of reference.

Processing by injection molding, injection-compression molding, by extrusion, or by compression molding are advantageous.

The examples below illustrate the invention, but do not limit the same.

General Operating Specification

About 50 g of the reaction mixture composed of dried and ground blend, POM, and, where appropriate, stabilizer were charged to the kneading chamber of a Brabender test kneader, and melted at the reaction temperature of about 240° C. The melt was kneaded for 50 minutes, and the formaldehyde liberated from this melt was entrained in a stream of nitrogen, and collected in a collection vessel, using aqueous sodium sulfite solution, and determined "on-line" by titration against sulfuric acid. The composition and the results obtained are given in the table below.

TABLE

| Example No. | POM content (% by wt) | Thermoplastic | Melamine addition (% by wt) | Mg stearate addition (% by wt) | NaOH addition (% by wt) | Formaldehyde emission (ppm) |
|---|---|---|---|---|---|---|
| C1 | 0.25 | PC[1]/ASA[2] | 0 | 0 | 0 | 704 |
| 1 | 0.25 | PC/ASA | 0 | 0.1 | 0 | 95 |
| 2 | 0.25 | PC/ASA | 0.1 | 0.1 | 0 | 170 |
| 3 | 0.25 | PC/ASA | 0 | 0.2 | 0 | 59 |
| C2 | 0.25 | PC/PBT[3] | 0 | 0 | 0 | 422 |
| 4 | 0.25 | PC/PBT | 0.1 | 0 | 0.1 | 74 |
| 5 | 0.25 | PC/PBT | 0.1 | 0 | 0.05 | 198 |
| 6 | 0.25 | PC/PBT | 0.05 | 0 | 0.1 | 63 |
| 7 | 0.25 | PC/PBT | 0 | 0 | 0.2 | 50 |
| C3 | 0.25 | PP[4] | 0 | 0 | 0 | 950 |
| 8 | 0.25 | PP | 0.1 | 0 | 0 | 347 |
| 9 | 0.25 | PP | 0.2 | 0 | 0 | 252 |
| 10 | 0.25 | PP | 0.3 | 0 | 0 | 186 |

[1]Polycarbonate
[2]Acrylonitrile-styrene-acrylate copolymer
[3]Polybutylene terephthalate
[4]Polypropylene

What is claimed is:

1. A process for reducing formaldehyde emission from thermoplastics based on a plastic other than polyacetal mixed with polyacetal, which comprises melting the thermoplastic mixture in the presence of at least one stabilizer in a mixing assembly and subjecting it to further processing steps.

2. The process as claimed in claim 1, where the stabilizer used comprises at least one carboxylic salt or at least one nitrogen containing stabilizer, or a mixture of these.

3. The process as claimed in claim 2, where the carboxylic salt used comprises at least one salt of a divalent metal ion.

4. The process as claimed in claim 3, where the carboxylic salt used comprises at least one carboxylic salt of an alkaline earth metal.

5. The process as claimed in claim 2, where the carboxylic salt used comprises calcium stearate, magnesium stearate, calcium citrate, tricalcium citrate or a mixture comprising at least one of these compounds.

6. The process as claimed in claim 2, where the amount used of the carboxylic salt is from 0.000 1 to 5% by weight.

7. The process as claimed in claim 2, where the nitrogen-containing stabilizer used comprises a heterocyclic compound which contains at least one nitrogen atom in the ring.

8. The process as claimed in claim 7, where the nitrogen-containing stabilizer comprises an aminopyridine derivative.

9. The process as claimed in claim 2, where the nitrogen-containing stabilizer comprises at least one compound selected from the group consisting of melamine 2,6-diaminopyridine, substituted and dimeric aminopyridines, hydantoin, allantoin, melamine-formaldehyde condensates, methylolmelamine, and polyamide.

10. The process as claimed in claim 2, where the amount used of the nitrogen-containing stabilizer is from 0.001 to 5% by weight.

11. A thermoplastic polycomposition based on a plastic other than polyacetal but comprising polyacetal and comprising at least one carboyxlic salt or comprising at least one nitrogen-containing stabilizer.

12. The process as claimed in claim 6, wherein said carboxylic salt comprises calcium citrate or tricalcium citrate.

13. The process as claimed in claim 1, wherein said carboxylic salt comprises magnesium stearate.

14. The process as claimed in claim 12, wherein the carboxylic salt is present from 0.001 to 1% by weight.

15. The process as claimed in claim 13, wherein the carboxylic salt is present from 0.001 to 1% by weight.

16. The process as claimed in claim 14, wherein the amount used of the nitrogen-containing stabilizer is from 0.01 to 1% by weight.

17. The process as claimed in claim 15, wherein the amount of nitrogen-containing stabilizer is from 0.01 to 1% by weight.

18. The process as claimed in claim 16, wherein the amount of nitrogen-containing stabilizer is from 0.03 to 0.5% by weight.

19. The process as claimed in claim 16, wherein the amount of nitrogen-containing stabilizer is from 0.03 to 0.5% by weight.

20. The process as claimed in claim 1, wherein the polyacetal is present in an amount up to 5.0% by weight based on the weight of the composition.

21. The process as claimed in claim 1, wherein the process is a recycling process.

\* \* \* \* \*

UNITED STATES PATENT AND TRADEMARK OFFICE
CERTIFICATE OF CORRECTION

PATENT NO. : 6,753,406 B2
DATED : June 22, 2004
INVENTOR(S) : Stefan Wulf et al.

It is certified that error appears in the above-identified patent and that said Letters Patent is hereby corrected as shown below:

Column 8,
Line 51, "0.000 1" should read -- 0.0001 --.

Signed and Sealed this

Twenty-third Day of November, 2004

JON W. DUDAS
*Director of the United States Patent and Trademark Office*